(12) United States Patent
Park et al.

(10) Patent No.: US 9,553,678 B2
(45) Date of Patent: Jan. 24, 2017

(54) INTERCONNECTION APPARATUS AND METHOD USING TERAHERTZ WAVES

(71) Applicant: Electronics and Telecommunications Research Institute, Daejeon (KR)

(72) Inventors: Kyung-Hyun Park, Daejeon (KR); Han-Cheol Ryu, Daejeon (KR); Jeong-Woo Park, Daejeon (KR); Sang-Pil Han, Daejeon (KR); Nam-Je Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 194 days.

(21) Appl. No.: 13/907,582

(22) Filed: May 31, 2013

(65) Prior Publication Data
US 2013/0320215 A1    Dec. 5, 2013

(30) Foreign Application Priority Data

May 31, 2012 (KR) .......................... 10-2012-0058307
Apr. 11, 2013 (KR) .......................... 10-2013-0040094

(51) Int. Cl.
*H04B 10/90* (2013.01)
*H04B 10/80* (2013.01)

(52) U.S. Cl.
CPC ............ *H04B 10/801* (2013.01); *H04B 10/90* (2013.01)

(58) Field of Classification Search
USPC .............................................. 250/340, 341.1
See application file for complete search history.

(56) References Cited

U.S. PATENT DOCUMENTS

| 8,755,692 B2 * | 6/2014 | Michaels | H04B 10/90 398/115 |
| 2007/0228280 A1 * | 10/2007 | Mueller | 250/341.1 |
| 2010/0067918 A1 * | 3/2010 | Federici | H04B 10/00 398/158 |
| 2011/0149368 A1 | 6/2011 | Kim et al. | |
| 2012/0068090 A1 | 3/2012 | Park | |
| 2012/0147907 A1 | 6/2012 | Kim et al. | |

(Continued)

FOREIGN PATENT DOCUMENTS

| KR | 10-2011-0069453 A | 6/2011 |
| KR | 10-2012-0030186 A | 3/2012 |

(Continued)

*Primary Examiner* — Christine Sung

(57) ABSTRACT

Disclosed herein is an interconnection apparatus and method using terahertz waves. The interconnection apparatus using terahertz waves according to the present invention includes a first terahertz wave generation unit for generating a first transmission terahertz wave, a center frequency of which is a first center frequency, using photomixing. A second terahertz wave generation unit generates a second transmission terahertz wave, a center frequency of which is a second center frequency different from the first center frequency. A first terahertz wave detection unit detects a first reception terahertz wave corresponding to the first transmission terahertz wave. A second terahertz wave detection unit detects a second reception terahertz wave corresponding to the second transmission terahertz wave.

16 Claims, 8 Drawing Sheets

(56) References Cited

U.S. PATENT DOCUMENTS

2014/0346357 A1\* 11/2014 Jarrahi .................... H01L 31/09
250/338.4
2015/0003257 A1\* 1/2015 Wang .................... H04L 43/045
370/241

FOREIGN PATENT DOCUMENTS

KR    10-2012-0059314 A    6/2012
KR    10-2012-0065808 A    6/2012

\* cited by examiner

INTERCONNECTION APPARATUS AND METHOD USING TERAHERTZ WAVES

CROSS REFERENCE TO RELATED APPLICATIONS

This application claims the benefit of Korean Patent Application Nos. 10-2012-0058307 filed on May 31, 2012 and 10-2013-0040094 filed on Apr. 11, 2013, which are hereby incorporated by reference in their entireties into this application.

BACKGROUND OF THE INVENTION

1. Technical Field

The present invention relates generally to an interconnection apparatus and method using terahertz waves and, more particularly, to an interconnection apparatus and method using terahertz waves, which generate terahertz waves using photomixing and transmit/receive the terahertz waves.

2. Description of the Related Art

Recently, the number of fields in which terahertz waves are used has rapidly increased, and such fields include medical treatment, medicine, agriculture and food, environment measurement, biology, communication, non-destructive investigation, and advanced material evaluation. Among these fields, a terahertz communication field for processing efficient data traffic has come to the fore.

Korean Unexamined Patent Publication No. 2012-0065808 relates to a terahertz wave generator for generating and detecting a terahertz wave. This patent discloses a dual-mode semiconductor laser device configured to generate laser light having at least two wavelengths and beat and output the generated laser light, and a photomixer formed on the same chip on which the dual-mode semiconductor laser device is formed and configured to be excited by the beaten laser light and then generate a continuous terahertz wave.

However, the conventional terahertz wave generator for generating and detecting the terahertz wave does not present detailed technology related to configuration which transmits/receives terahertz waves while adjusting a speed according to the number of frequency blocks by modularizing terahertz wave generation units and terahertz wave detection units in correspondence with the channels of a frequency band including a single center frequency. Further, the conventional technology is problematic in that, as the number of frequency blocks increases, a required frequency bandwidth also increases. In spite of this problem, the conventional technology does not describe configuration which transmits/receives terahertz waves while reducing a frequency bandwidth by arranging frequency blocks corresponding to the respective channels of the same frequency band so that they do not neighbor each other.

Therefore, new interconnection technology using terahertz waves are urgently required which can generate terahertz waves even if an expensive femtosecond laser required by a Terahertz (THz)-Time Domain Spectroscopy (TDS) system is not used, by using photomixing upon generating terahertz waves, can adjust a speed according to the number of frequency blocks by modularizing terahertz wave generation units and terahertz wave detection units in frequency blocks in correspondence with the channels of a frequency band including a single center frequency, can reduce crosstalk between channels by changing oscillation wavelengths of exciting light sources and by performing photomixing upon generating the terahertz waves, can reduce crosstalk between frequency blocks by utilizing a narrow-band filter and a terahertz passive filter, can reduce a frequency bandwidth by arranging frequency blocks corresponding to the respective channels of the same frequency band so that they do not neighbor each other because of the problem of a required frequency bandwidth increasing as the number of frequency blocks increases, and can realize duplexing by simultaneously transmitting a transmission terahertz wave and receiving a reception terahertz wave.

SUMMARY OF THE INVENTION

Accordingly, the present invention has been made keeping in mind the above problems occurring in the prior art, and an object of the present invention is to generate terahertz waves and transmit/receive the terahertz waves even if an expensive femtosecond laser required by a THz-Time Domain Spectroscopy (TDS) system is not used, by using photomixing upon generating the terahertz waves.

Another object of the present invention is to modularize terahertz wave generation units and terahertz wave detection units in frequency blocks in correspondence with channels of a frequency band including a single center frequency, thus transmitting/receiving terahertz waves while adjusting a speed according to the number of frequency blocks.

A further object of the present invention is to generate terahertz waves and transmit/receive the terahertz waves while reducing crosstalk between channels, by changing oscillation wavelengths of exciting light sources and by performing photomixing upon generating the terahertz waves.

Yet another object of the present invention is to transmit/receive terahertz waves while reducing crosstalk between frequency blocks by utilizing a narrow-band filter and a terahertz passive filter.

Still another object of the present invention is to transmit/receive terahertz waves while reducing a frequency bandwidth, by arranging frequency blocks corresponding to the respective channels of the same frequency band so that they do not neighbor each other because of the problem of a required frequency bandwidth increasing as the number of frequency blocks increases.

Still another object of the present invention is to enable duplexing by simultaneously transmitting a transmission terahertz wave and receiving a reception terahertz wave.

In accordance with an aspect of the present invention to accomplish the above objects, there is provided an interconnection apparatus using terahertz waves, including a first terahertz wave generation unit for generating a first transmission terahertz wave, a center frequency of which is a first center frequency, using photomixing; a second terahertz wave generation unit for generating a second transmission terahertz wave, a center frequency of which is a second center frequency different from the first center frequency; a first terahertz wave detection unit for detecting a first reception terahertz wave corresponding to the first transmission terahertz wave; and a second terahertz wave detection unit for detecting a second reception terahertz wave corresponding to the second transmission terahertz wave.

Preferably, the first center frequency and the second center frequency may be respectively set by changing oscillation wavelengths of exciting light sources used for the photomixing.

Preferably, the first terahertz wave generation unit and the first terahertz wave detection unit may be modularized in a first terahertz wave transmission/reception unit corresponding to a first channel of a frequency band including the first center frequency, and the second terahertz wave generation unit and the second terahertz wave detection unit may be modularized in a second terahertz wave transmission/reception unit corresponding to a second channel of a frequency band including the second center frequency.

Preferably, the oscillation wavelengths of the exciting light sources may be changed to reduce crosstalk between the first channel and the second channel.

Preferably, the interconnection apparatus may further include frequency blocks of terahertz wave transmission/reception units respectively corresponding to a plurality of channels including the first and second channels, wherein each of the terahertz wave transmission/reception units are configured such that a terahertz wave generation unit and a corresponding terahertz wave detection unit are modularized in a corresponding terahertz wave transmission/reception unit.

Preferably, the frequency blocks may use a narrow-band filter and a terahertz passive filter to reduce mutual crosstalk between the frequency blocks.

Preferably, two or more of the frequency blocks may correspond to respective channels of an identical frequency band so as to reduce a frequency bandwidth.

Preferably, the frequency blocks of the terahertz wave transmission/reception units corresponding to the respective channels of the identical frequency band may be arranged such that the frequency blocks do not neighbor each other so as to reduce mutual crosstalk between the frequency blocks.

Preferably, the first terahertz wave transmission/reception unit may simultaneously transmit the first transmission terahertz wave and receive the first reception terahertz wave.

Preferably, the first terahertz wave detection unit may detect the first reception terahertz wave using a Schottky diode.

Preferably, the first terahertz wave transmission/reception unit may modulate the first transmission terahertz wave using one or more of modulation based on a beating light source and bias modulation based on a photomixer and transmit the modulated first transmission terahertz wave.

Preferably, the first terahertz wave transmission/reception unit may set an upstream center frequency of the first transmission terahertz wave and a downstream center frequency of the first reception terahertz wave as different frequencies.

Preferably, the frequency blocks may be arranged in a form of an array for large-capacity transmission.

In accordance with another aspect of the present invention to accomplish the above objects, there is provided an interconnection method using terahertz waves, including generating a first transmission terahertz wave, a center frequency of which is a first center frequency, using photomixing; generating a second transmission terahertz wave, a center frequency of which is a second center frequency different from the first center frequency; detecting a first reception terahertz wave corresponding to the first transmission terahertz wave; and detecting a second reception terahertz wave corresponding to the second transmission terahertz wave.

Preferably, the first center frequency and the second center frequency may be respectively set by changing oscillation wavelengths of exciting light sources used for the photomixing.

Preferably, generating the first transmission terahertz wave and detecting the first reception terahertz wave may be modularized in transmitting/receiving a first terahertz wave corresponding to a first channel of a frequency band including the first center frequency, and generating the second transmission terahertz wave and detecting the second reception terahertz wave may be modularized in transmitting/receiving a second terahertz wave corresponding to a second channel of a frequency band including the second center frequency.

Preferably, the oscillation wavelengths of the exciting light sources may be changed to reduce crosstalk between the first channel and the second channel.

Preferably, the interconnection method may further include transmitting/receiving terahertz waves respectively corresponding to a plurality of channels including the first and second channels, wherein transmitting/receiving each of the terahertz waves is configured such that generating a transmission terahertz wave and detecting a corresponding reception terahertz wave are modularized in transmitting/receiving a corresponding terahertz wave.

Preferably, transmitting/receiving the terahertz waves may be configured to use a narrow-band filter and a terahertz passive filter to reduce mutual crosstalk between the channels.

Preferably, two or more of the transmitting/receiving terahertz waves may correspond to respective channels of an identical frequency band so as to reduce a frequency bandwidth.

Preferably, transmitting/receiving the terahertz waves corresponding to the respective channels of the identical frequency band may be configured to transmit/receive the terahertz waves so that the channels do not neighbor each other so as to reduce mutual crosstalk between the channels.

Preferably, transmitting/receiving the first terahertz wave may be configured to simultaneously transmit the first transmission terahertz wave and receive the first reception terahertz wave.

Preferably, detecting the first reception terahertz wave may be configured to detect the first reception terahertz wave using a Schottky diode.

Preferably, transmitting/receiving the first terahertz wave may be configured to modulate the first transmission terahertz wave using one or more of modulation based on a beating light source and bias modulation based on a photomixer and transmit the modulated first transmission terahertz wave.

Preferably, transmitting/receiving the first terahertz wave may be configured to set an upstream center frequency of the first transmission terahertz wave and a downstream center frequency of the first reception terahertz wave as different frequencies.

Preferably, transmitting/receiving the terahertz waves may be configured to transmit/receive the terahertz waves in a form of an array for large-capacity transmission.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
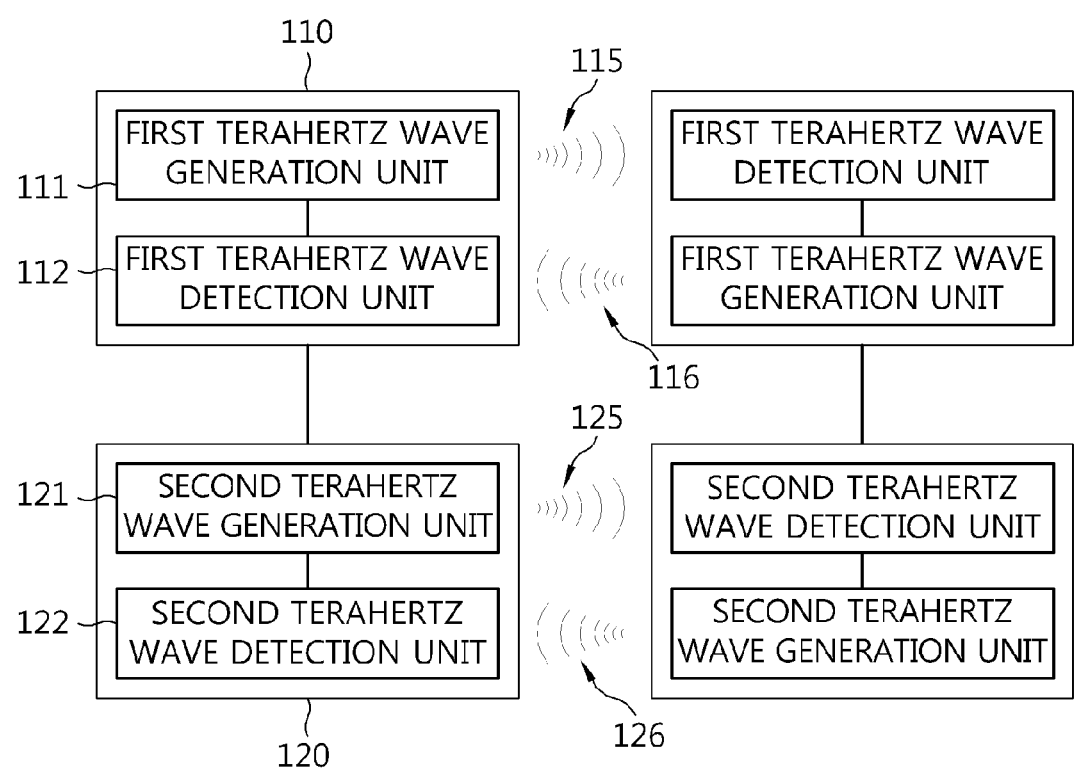
FIG. 1 is a block diagram showing an embodiment of an interconnection apparatus using terahertz waves according to the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a block diagram showing an embodiment of an interconnection apparatus using terahertz waves according to the present invention.

Referring to FIG. 1, the interconnection apparatus using terahertz waves according to the present invention includes a first terahertz wave generation unit 111, a first terahertz wave detection unit 112, a second terahertz wave generation unit 121, and a second terahertz wave detection unit 122.

The first terahertz wave generation unit 111 may generate a first transmission terahertz wave 115, the center frequency of which is a first center frequency 310 (see FIG. 3), using photomixing.

The first terahertz wave detection unit 112 may detect a first reception terahertz wave 116 corresponding to the first transmission terahertz wave 115.

Further, the second terahertz wave generation unit 121 may generate a second transmission terahertz wave 125, the center frequency of which is a second center frequency 320 (see FIG. 3) different from the first center frequency 310, using photomixing.

The second terahertz wave detection unit 122 may detect a second reception terahertz wave 126 corresponding to the second transmission terahertz wave 125.

In this case, the above photomixing may be photomixing that uses a difference between oscillation wavelengths of exciting light sources 510 and 520 (see FIG. 5) obtained by applying a voltage to electrons and holes in semiconductor and accelerating the electrons and the holes.

In this way, the interconnection apparatus using terahertz waves may generate terahertz waves without utilizing an expensive femtosecond laser required by a THz-TDS system, by using photomixing that exploits the difference between the oscillation wavelengths of the exciting light sources 510 and 520.

The first center frequency 310 and the second center frequency 320 may be set by respectively changing the oscillation wavelengths of the exciting light sources 510 and 520 used for the above-described photomixing.

The first terahertz wave generation unit 111 and the first terahertz wave detection unit 112 may be modularized in a first terahertz wave transmission/reception unit 110 corresponding to a first channel of a frequency band including the first center frequency 310. The second terahertz wave generation unit 121 and the second terahertz wave detection unit 122 may be modularized in a second terahertz wave transmission/reception unit 120 corresponding to a second channel of a frequency band including the second center frequency 320.

In this case, the oscillation wavelengths of the exciting light sources 510 and 520 may be changed so as to reduce crosstalk between the first channel and the second channel.

Further, the oscillation wavelengths of the exciting light sources 510 and 520 are configured such that center frequencies of terahertz waves may be adjusted according to the difference between the oscillation wavelengths.

In this regard, the oscillation wavelengths of the exciting light sources 510 and 520 may be changed so that the first center frequency 310 corresponding to the first channel and the second center frequency 320 corresponding to the second channel are different from each other.

In this way, the interconnection apparatus using terahertz waves may reduce crosstalk between the first and second channels by using the difference between the oscillation wavelengths of the exciting light sources 510 and 520.

In this case, the interconnection apparatus using terahertz waves may include frequency blocks of terahertz wave transmission/reception units respectively corresponding to a plurality of channels.

The frequency blocks may be implemented using a narrow-band filter and a terahertz passive filter so as to reduce mutual crosstalk between them.

Here, the interconnection apparatus using terahertz waves may include frequency blocks of the terahertz wave transmission/reception units corresponding to respective channels of the same frequency band so as to reduce a frequency bandwidth.

For example, the interconnection apparatus using terahertz waves may include frequency blocks of terahertz wave transmission/reception units respectively corresponding to a first channel of a frequency band including a first center frequency 310, a second channel of a frequency band including a second center frequency 320, a third channel of a frequency band including a third center frequency 330, and a fourth channel of a frequency band including a fourth center frequency 340.

In this case, the interconnection apparatus using terahertz waves may increase the number of frequency blocks, thus transmitting/receiving terahertz waves at a speed obtained by multiplying a transmission/reception speed corresponding to a single frequency block by the number of frequency blocks.

In this case, the frequency blocks of the terahertz wave transmission/reception units corresponding to the respective channels of the same frequency band may be arranged such that they do not neighbor each other so as to reduce mutual crosstalk between them.

For example, the frequency blocks of the terahertz wave transmission/reception units respectively corresponding to the first channel and the third channel of the frequency band including the first center frequency 310 may be arranged such that they do not neighbor each other so as to reduce mutual crosstalk between them.

Further, for example, the frequency blocks of the terahertz wave transmission/reception units respectively corresponding to the first channel and the third channel of the frequency band including the first center frequency 310 and corresponding to the second channel and the fourth channel of the frequency band including the second center frequency 320 may be arranged in the sequence of the first channel, the second channel, the third channel, and the fourth channel so that they do not neighbor each other in order to reduce mutual crosstalk between them.

In this way, the interconnection apparatus using terahertz waves is configured to arrange the frequency blocks of the terahertz wave transmission/reception units corresponding to the respective channels of the same frequency band so that they do not neighbor each other, thus enabling a plurality of channels to be provided even in a narrow-bandwidth.

Here, the first terahertz wave transmission/reception unit 110 may simultaneously transmit the first transmission terahertz wave 115 and receive the first reception terahertz wave 116.

The first terahertz wave transmission/reception unit 110 may modulate the first transmission terahertz wave 115 using one or more of modulation based on a beating light source and bias modulation based on a photomixer, and may transmit the modulated first transmission terahertz wave 115.

In this case, the first terahertz wave transmission/reception unit 110 may set the upstream center frequency of the first transmission terahertz wave 115 and the downstream center frequency of the first reception terahertz wave 116 as different frequencies.

Further, the frequency blocks may be arranged in the form of an array for large-capacity transmission.

Figure 6:
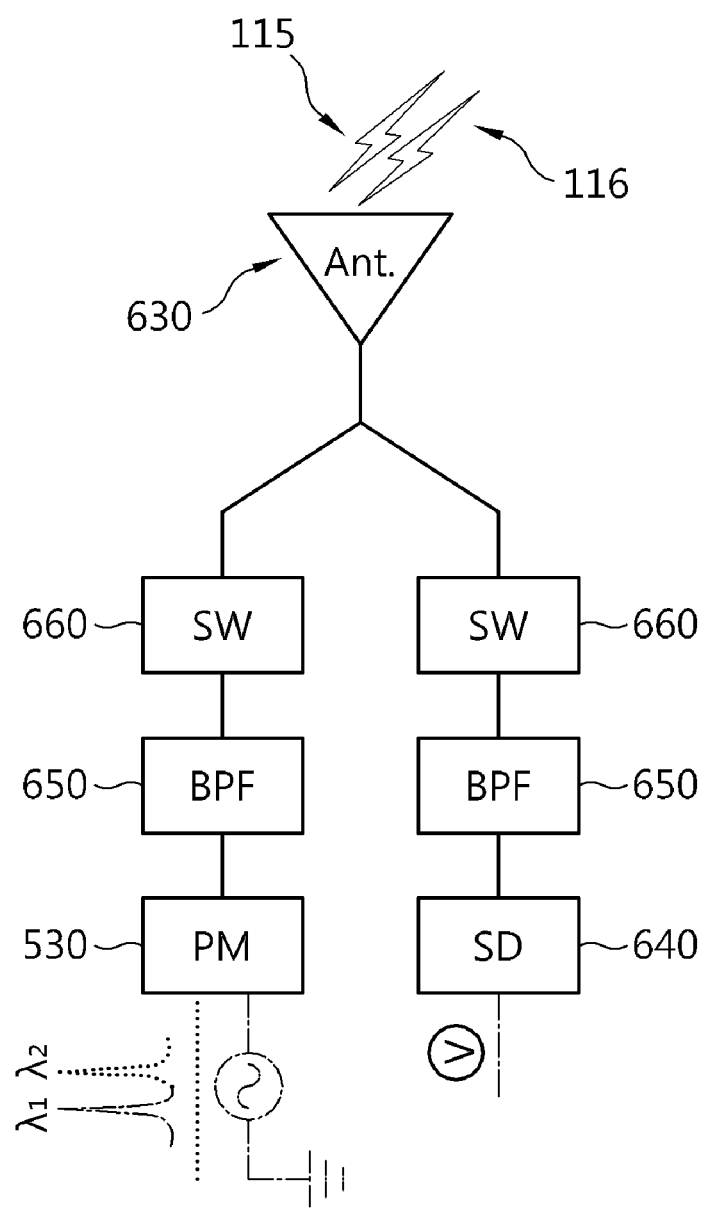
FIG. 6 is a diagram showing an example of a case where the center frequencies of a transmission terahertz wave and a reception terahertz wave are identical to each other in the interconnection apparatus using terahertz waves according to the present invention.

Meanwhile, the first terahertz wave transmission/reception unit 110 may encode and generate the first transmission terahertz wave 115 and may decode and detect the first reception terahertz wave 116 using an encoding/decoding device 660 (see FIG. 6).

In this way, the interconnection apparatus using terahertz waves may encode and generate a transmission terahertz wave and may decode and detect a reception terahertz wave, thus enabling duplexing using the transmission terahertz wave and the reception terahertz wave having the same center frequency.

Figure 7:
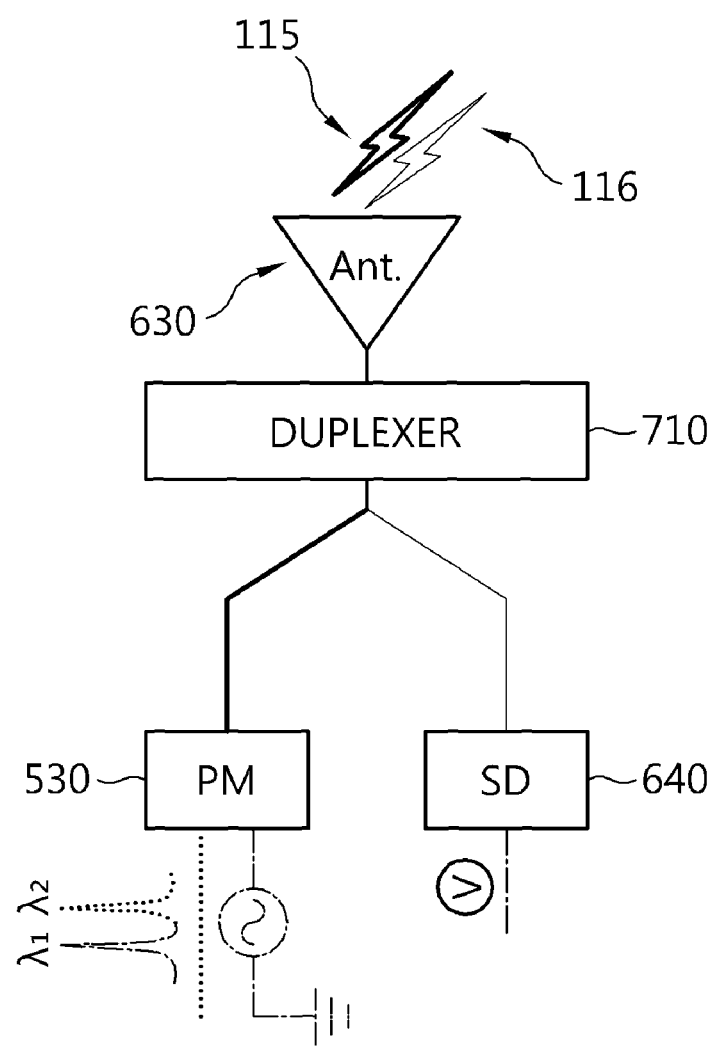
FIG. 7 is a diagram showing an example of a case where the center frequencies of a transmission terahertz wave and a reception terahertz wave are different from each other in the interconnection apparatus using terahertz waves according to the present invention.

In this regard, the first terahertz wave transmission/reception unit 110 may simultaneously transmit the first transmission terahertz wave 115 and receive the first reception terahertz wave 116 using a duplexer 710 (see FIG. 7).

Furthermore, the interconnection apparatus using terahertz waves may perform duplexing using a transmission terahertz wave and a reception terahertz wave which has a center frequency different from that of the transmission terahertz wave by utilizing the duplexer 710.

Here, the first terahertz wave detection unit 112 may detect the first reception terahertz wave 116 using a Schottky diode 640 (see FIG. 7).

Figure 8:
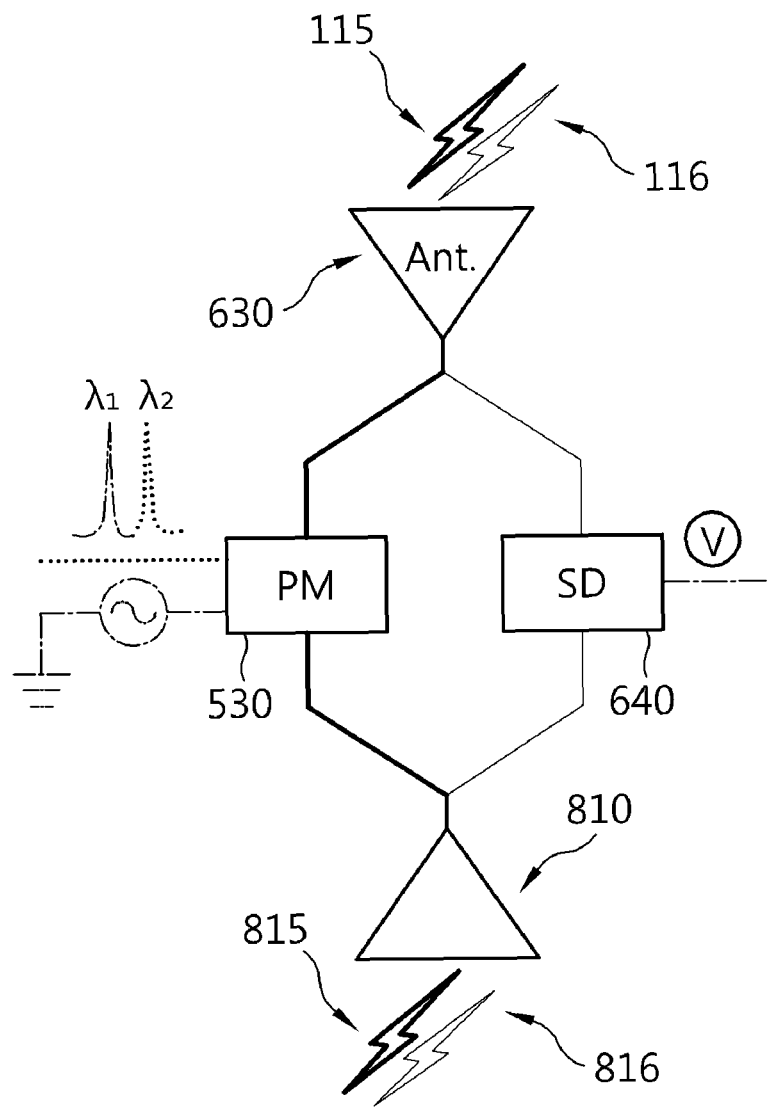
FIG. 8 is a diagram showing a case where the number of antennas is two in the interconnection apparatus using terahertz waves according to the present invention.

Meanwhile, referring to FIG. 8, the interconnection apparatus using terahertz waves may simultaneously transmit a plurality of transmission terahertz waves 115 and 815 and receive a plurality of reception terahertz waves 116 and 816 by using a single photomixer 530, a Schottky diode 640, and a plurality of antennas 630 and 810.

Figure 2:
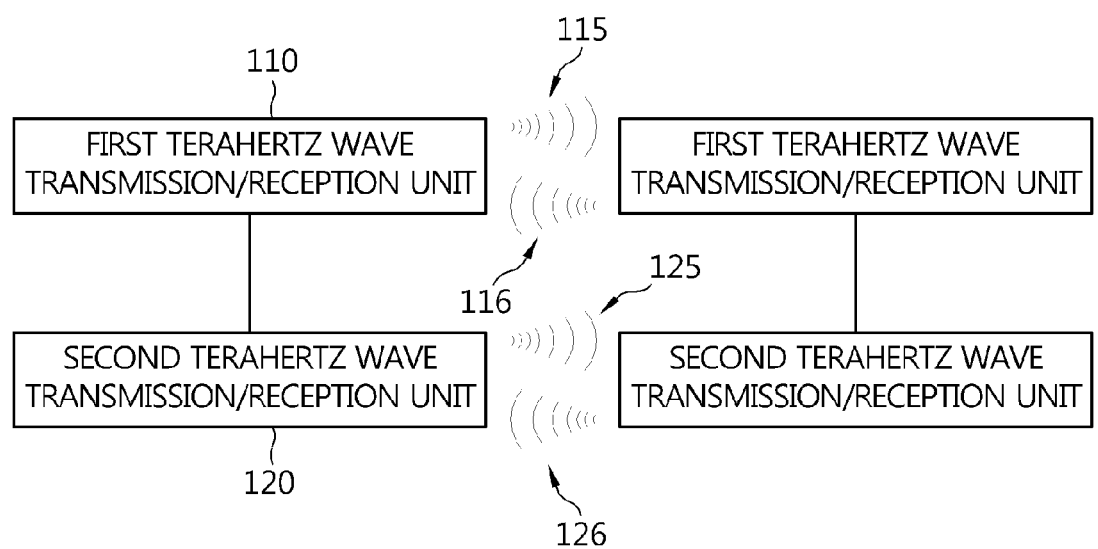
FIG. 2 is a block diagram showing an example of the modularization of transmission/reception units according to the present invention.

FIG. 2 is a block diagram showing an example of modularization of transmission/reception units according to the present invention.

Referring to FIG. 2, the first terahertz wave generation unit 111 and the first terahertz wave detection unit 112 according to the present invention are modularized in the first terahertz wave transmission/reception unit 110 corresponding to the first channel of a frequency band including a first center frequency 310, and the second terahertz wave generation unit 121 and the second terahertz wave detection unit 122 may be modularized in the second terahertz wave transmission/reception unit 120 corresponding to the second channel of a frequency band including a second center frequency 320.

Figure 3:
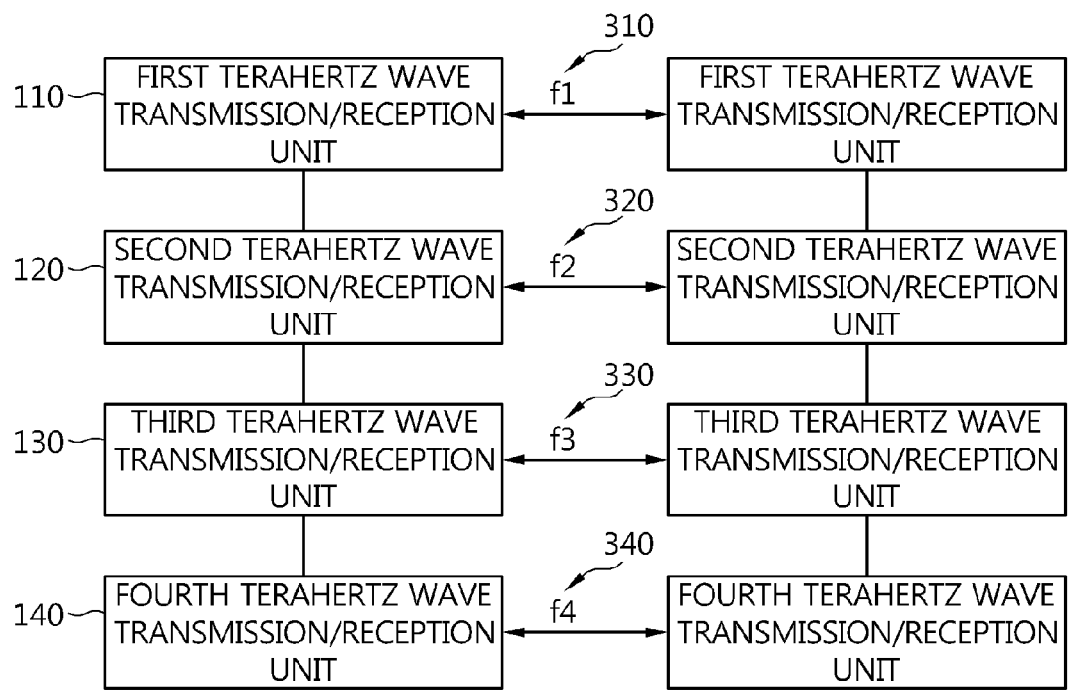
FIG. 3 is a block diagram showing an example of frequency blocks according to the present invention.

FIG. 3 is a block diagram showing an example of frequency blocks according to the present invention.

Referring to FIG. 3, the interconnection apparatus using terahertz waves according to the present invention may include frequency blocks of terahertz wave transmission/reception units respectively corresponding to a plurality of channels.

In this case, the frequency blocks may use a narrow-band filter and a terahertz passive filter so as to reduce crosstalk between them.

Further, the interconnection apparatus using terahertz waves may include frequency blocks of terahertz wave transmission/reception units corresponding to respective channels of the same frequency band so as to reduce a frequency bandwidth.

For example, the interconnection apparatus using terahertz waves may include frequency blocks of terahertz wave transmission/reception units respectively corresponding to the first channel of a frequency band including a first center frequency 310, the second channel of a frequency band including a second center frequency 320, the third channel of a frequency band including a third center frequency 330, and the fourth channel of a frequency band including a fourth center frequency 340.

In this case, the interconnection apparatus using terahertz waves may increase the number of frequency blocks, thus transmitting/receiving terahertz waves at a speed obtained by multiplying a transmission/reception speed corresponding to a single frequency block by the number of frequency blocks.

Figure 4:
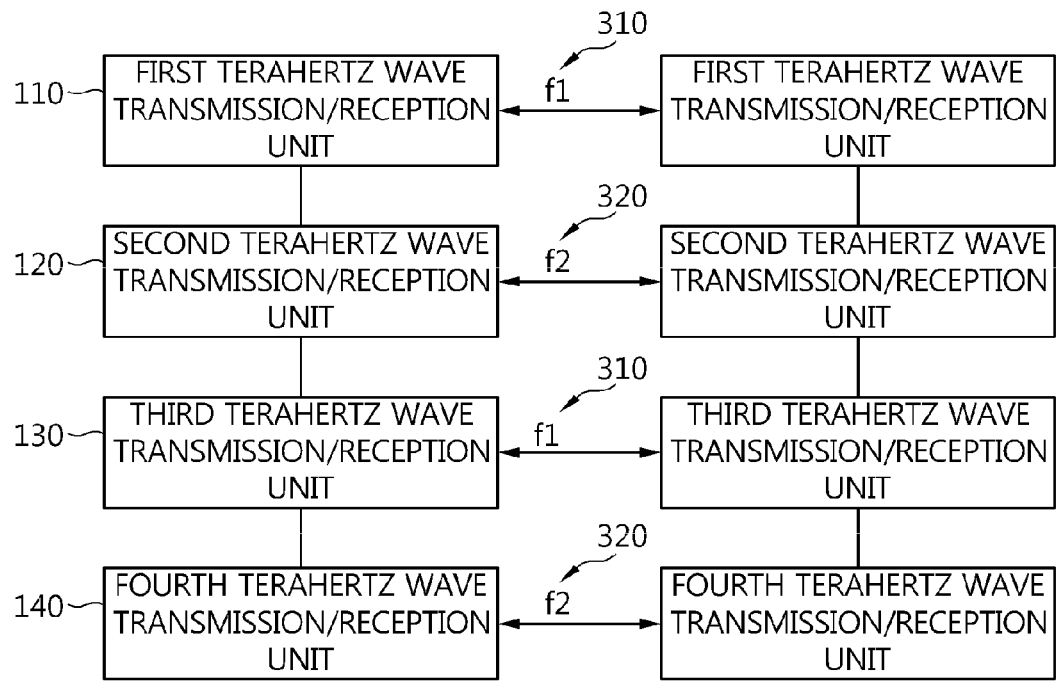
FIG. 4 is a block diagram showing an example in which frequency blocks are arranged such that they do not neighbor each other so as to reduce mutual crosstalk between them according to the present invention.

FIG. 4 is a block diagram showing an example in which frequency blocks are arranged such that they do not neighbor each other so as to reduce mutual crosstalk between them according to the present invention.

Referring to FIG. 4, the frequency blocks of terahertz wave transmission/reception units corresponding to the respective channels of the same frequency band according to the present invention may be arranged such that they do not neighbor each other so as to reduce mutual crosstalk between them.

For example, frequency blocks of terahertz wave transmission/reception units respectively corresponding to a first channel and a third channel of a frequency band including a first center frequency 310 may be arranged such that they do not neighbor each other so as to reduce mutual crosstalk between them.

For example, the frequency blocks of the terahertz wave transmission/reception units respectively corresponding to the first channel and the third channel of the frequency band including the first center frequency 310 and the frequency blocks of terahertz wave transmission/reception units respectively corresponding to a second channel and a fourth channel of a frequency band including a second center frequency 320 may be arranged in the sequence of the first channel, the second channel, the third channel, and the fourth channel so that the frequency blocks do not neighbor each other so as to reduce mutual crosstalk between them.

In this way, the interconnection apparatus using terahertz waves may have a plurality of channels in a narrow bandwidth by arraigning frequency blocks of terahertz wave transmission/reception units corresponding to respective channels of the same frequency band so that they do not neighbor each other.

Figure 5:
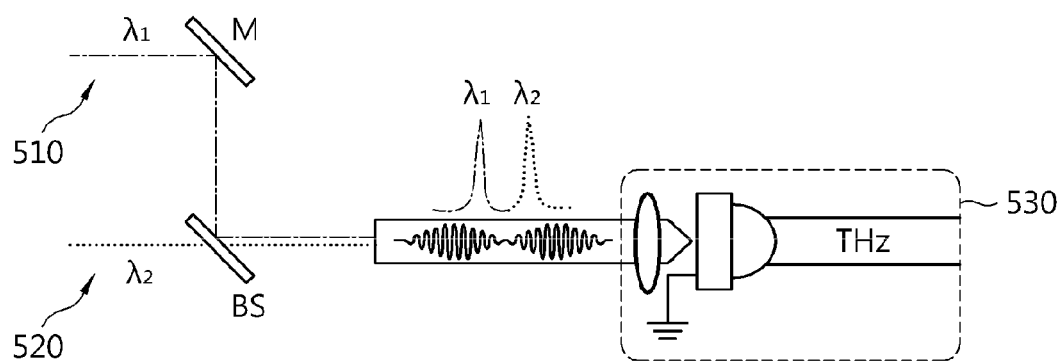
FIG. 5 is a diagram showing an example of photomixing according to the present invention.

FIG. 5 is a diagram showing an example of photomixing according to the present invention.

Referring to FIG. 5, the above photomixing may be photomixing that uses a difference between the oscillation wavelengths of exciting light sources 510 and 520 obtained by applying a voltage to electrons and holes in semiconductor and accelerating the electrons and the holes.

In this way, the interconnection apparatus using terahertz waves may generate terahertz waves without utilizing an expensive femtosecond laser required by a THz-TDS system, by using photomixing that exploits the difference between the oscillation wavelengths of the exciting light sources 510 and 520.

In this case, the power of terahertz waves generated by a photomixer 530 may be $P_{THz}$ represented by the following Equation (1):

$$P_{THz} = 2(I_0)^2 R_A \frac{mP_1P_2}{P_0^2[1+(\omega\tau)^2][1+(\omega R_A C)^2]} \quad (1)$$

In Equation (1), $P_1$ denotes the optical power of a first exciting light source, $P_2$ denotes the optical power of a second exciting light source, $P_0$ denotes the mean power of the first and second exciting light sources, $I_0$ denotes Direct Current (DC) photocurrent, $R_A$ denotes the radiation resistance of an antenna, C denotes the capacitance of a photoconductor, $\tau$ denotes the duration of charges, and m denotes the mixing efficiency of the first and second exciting light sources.

FIG. 6 is a diagram showing an example of a case where the center frequencies of a transmission terahertz wave and a reception terahertz wave are identical to each other in the interconnection apparatus using terahertz waves according to the present invention.

Referring to FIG. 6, the first terahertz wave transmission/reception unit 110 may encode and generate a first transmission terahertz wave 115 and may decode and detect a first reception terahertz wave 116 by using decoding/encoding devices 660.

In this way, the interconnection apparatus using terahertz waves may perform duplexing using the transmission terahertz wave and the reception terahertz wave having the same center frequency by encoding and generating the transmission terahertz wave and by decoding and detecting the reception terahertz wave.

FIG. 7 is a diagram showing an example of a case where the center frequencies of a transmission terahertz wave and a reception terahertz wave are different from each other in the interconnection apparatus using terahertz waves according to the present invention.

Referring to FIG. 7, the first terahertz wave transmission/reception unit 110 may simultaneously transmit a first transmission terahertz wave 115 and receive a first reception terahertz wave 116 by utilizing a duplexer 710.

In this way, the interconnection apparatus using terahertz waves may perform duplexing using the transmission terahertz wave and the reception terahertz wave having a center frequency different from that of the transmission terahertz wave by utilizing the duplexer 710.

FIG. 8 is a diagram showing a case where the number of antennas is two in the interconnection apparatus using terahertz waves according to the present invention.

Referring to FIG. 8, the interconnection apparatus using terahertz waves may simultaneously transmit a plurality of transmission terahertz waves 115 and 815 and receive a plurality of reception terahertz waves 116 and 816 by using a single photomixer 530, a single Schottky diode 640, and a plurality of antennas 630 and 810.

Figure 9:
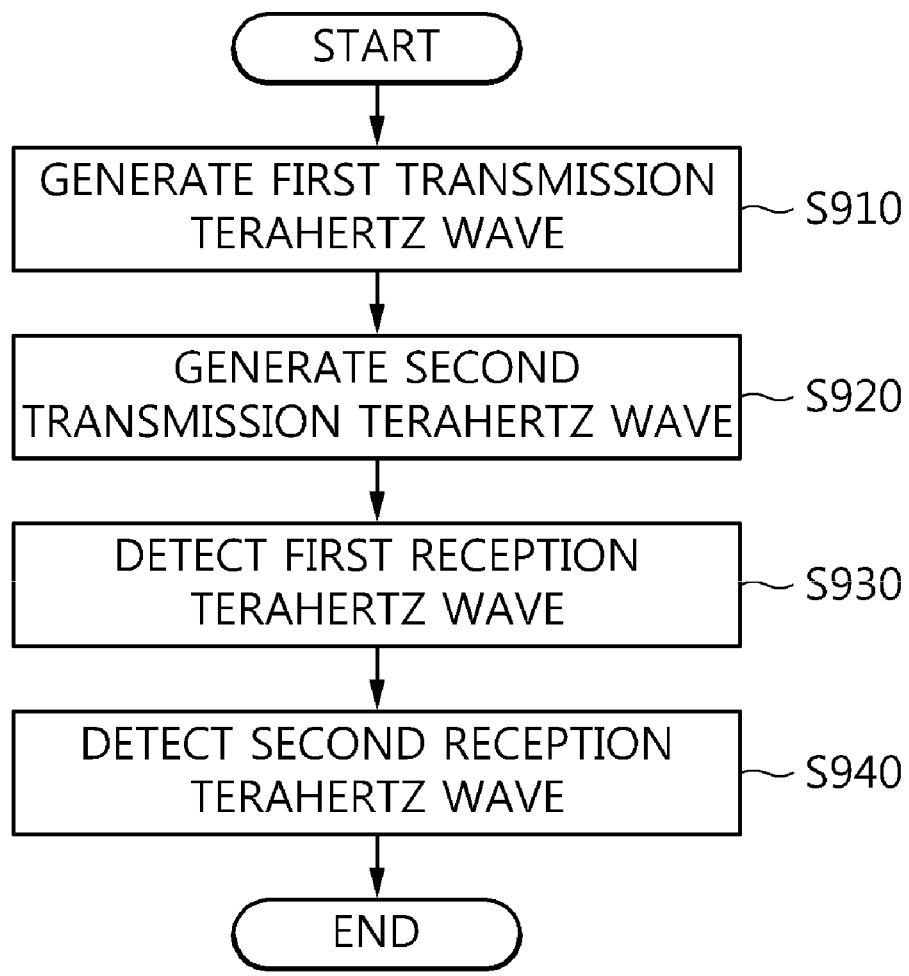
FIG. 9 is an operating flowchart showing an embodiment of an interconnection method using terahertz waves according to the present invention.

FIG. 9 is an operating flowchart showing an embodiment of an interconnection method using terahertz waves according to the present invention.

Referring to FIG. 9, in the interconnection method using terahertz waves according to the present invention, a first transmission terahertz wave 115, the center frequency of which is a first center frequency 310, is generated using photomixing at step S910.

Next, in the interconnection method using terahertz waves according to the present invention, a second transmission terahertz wave 125, the center frequency of which is a second center frequency 320 different from the first center frequency 310, is generated using photomixing at step S920.

Then, in the interconnection method using terahertz waves according to the present invention, a first reception terahertz wave 116 corresponding to the first transmission terahertz wave 115 is detected at step S930.

Further, in the interconnection method using terahertz waves according to the present invention, a second reception terahertz wave 126 corresponding to the second transmission terahertz wave 125 is detected at step S940.

In this case, the above photomixing may be photomixing that uses a difference between the oscillation wavelengths of exciting light sources 510 and 520 obtained by applying a voltage to electrons and holes in semiconductor and accelerating the electrons and the holes.

In this way, the interconnection method using terahertz waves may generate terahertz waves without utilizing an expensive femtosecond laser required by a THz-TDS system, by using photomixing that exploits the difference between the oscillation wavelengths of the exciting light sources 510 and 520.

The first center frequency 310 and the second center frequency 320 may be respectively set by changing the oscillation wavelengths of the exciting light sources 510 and 520 used for the photomixing.

In this case, steps S910 and S930 may be modularized in a first terahertz wave transmission/reception step corresponding to the first channel of a frequency band including the first center frequency 310, and steps S920 and S940 may be modularized in a second terahertz wave transmission/reception step corresponding to the second channel of a frequency band including the second center frequency 320.

The oscillation wavelengths of the exciting light sources 510 and 520 may be changed so as to reduce crosstalk between the first channel and the second channel.

In this case, the center frequencies of the terahertz waves may be adjusted according to a difference between the oscillation wavelengths of the exciting light sources 510 and 520.

Further, the oscillation wavelengths of the exciting light sources 510 and 520 may be changed so that the first center frequency 310 corresponding to the first channel and the second center frequency 320 corresponding to the second channel are different from each other.

In this way, the interconnection method using terahertz waves may reduce crosstalk between the first channel and the second channel by utilizing the difference between the oscillation wavelengths of the exciting light sources 510 and 520.

Further, the interconnection method using terahertz waves may include terahertz wave transmission/reception steps respectively corresponding to a plurality of channels.

The terahertz wave transmission/reception steps may be performed using a narrow-band filter and a terahertz passive filter so as to reduce crosstalk between channels.

The interconnection method using terahertz waves may include terahertz wave transmission/reception steps corresponding to the respective channels of the same frequency band so as to reduce a frequency bandwidth.

For example, the interconnection method using terahertz waves may include terahertz wave transmission/reception steps respectively corresponding to the first channel of the frequency band including the first center frequency 310, the second channel of the frequency band including the second center frequency 320, the third channel of the frequency band including the third center frequency 330, and the fourth channel of the frequency band including the fourth center frequency 340.

In this case, the interconnection method using terahertz waves may increase the number of channels, thus transmitting/receiving terahertz waves at a speed obtained by multiplying a transmission/reception speed corresponding to a single channel by the number of channels.

The terahertz wave transmission/reception steps corresponding to the respective channels of the same frequency band may be configured to arrange the respective channels so that they do not neighbor each other so as to reduce mutual crosstalk between the channels.

For example, the terahertz wave transmission/reception steps corresponding to the first channel and the third channel of the frequency band including the first center frequency 310 may be configured to arrange the first channel and the third channel so that they do not neighbor each other so as to reduce mutual crosstalk between them.

For example, terahertz wave transmission/reception steps respectively corresponding to the first channel and the third channel of the frequency band including the first center frequency 310 and corresponding to the second channel and the fourth channel of the frequency band including the second center frequency 320 may be configured to arrange the channels in the sequence of the first channel, the second channel, the third channel, and the fourth channel so that they do not neighbor each other in order to reduce mutual crosstalk between them.

In this way, the interconnection method using terahertz waves configures terahertz wave transmission/reception steps respectively corresponding to the channels of the same frequency band so that the channels do not neighbor each other, thus having a plurality of channels in a narrow bandwidth.

The first terahertz wave transmission/reception step may be configured to simultaneously transmit a first transmission terahertz wave 115 and receive a first reception terahertz wave 116.

In this case, the first terahertz wave transmission/reception step may be configured to modulate the first transmission terahertz wave 115 using one or more of modulation based on a beating light source and bias modulation based on a photomixer and to transmit the modulated first transmission terahertz wave 115.

Furthermore, the first terahertz wave transmission/reception step may be configured to set the upstream center frequency of the first transmission terahertz wave 115 and the downstream center frequency of the first reception terahertz wave 116 as different frequencies.

The terahertz wave transmission/reception steps may be configured to transmit/receive terahertz waves in the form of an array for large-capacity transmission.

The first terahertz wave transmission/reception step is configured to encode and generate the first transmission terahertz wave 115 and decode and detect the first reception terahertz wave 116 by using decoding/encoding devices 660.

In this way, the interconnection method using terahertz waves may encode and generate the transmission terahertz wave and decode and detect the reception terahertz wave, thus performing duplexing using the transmission terahertz wave and the reception terahertz wave having the same center frequency.

Further, the first terahertz wave transmission/reception step may be configured to simultaneously transmit the first transmission terahertz wave 115 and receive the first reception terahertz wave 116 by utilizing a duplexer 710.

In this way, the interconnection method using terahertz waves may perform duplexing using a transmission terahertz wave and a reception terahertz wave having a center frequency different from that of the transmission terahertz wave by utilizing the duplexer 710.

Step S930 may be configured to detect the first reception terahertz wave 116 using a Schottky diode 640.

In this case, the interconnection method using terahertz waves may simultaneously transmit a plurality of transmission terahertz waves 115 and 815 and receive a plurality of reception terahertz waves 116 and 816 by employing a single photomixer 530, a single Schottky diode 640, and a plurality of antennas 630 and 810.

As described above, the present invention may generate terahertz waves and transmit/receive the terahertz waves even if an expensive femtosecond laser required by a THz-Time Domain Spectroscopy (TDS) system is not used, by using photomixing upon generating the terahertz waves.

Further, the present invention may modularize terahertz wave generation units and terahertz wave detection units in frequency blocks in correspondence with channels of a frequency band including a single center frequency, thus transmitting/receiving terahertz waves while adjusting a speed according to the number of frequency blocks.

Furthermore, the present invention may generate terahertz waves and transmit/receive the terahertz waves while reducing crosstalk between channels, by changing oscillation wavelengths of exciting light sources and by performing photomixing upon generating the terahertz waves.

Furthermore, the present invention may transmit/receive terahertz waves while reducing crosstalk between frequency blocks by utilizing a narrow-band filter and a terahertz passive filter.

Furthermore, the present invention may transmit/receive terahertz waves while reducing a frequency bandwidth, by arranging frequency blocks corresponding to the respective channels of the same frequency band so that they do not neighbor each other because of the problem of a required frequency bandwidth increasing as the number of frequency blocks increases.

Furthermore, the present invention may enable duplexing by simultaneously transmitting a transmission terahertz wave and receiving a reception terahertz wave.

As described above, in the interconnection apparatus and method using terahertz waves according to the present invention, the configurations and schemes in the above-described embodiments are not limitedly applied, and some or all of the above embodiments can be selectively combined and configured so that various modifications are possible.

What is claimed is:

1. An interconnection apparatus using terahertz waves, comprising:
    a first terahertz wave generation unit configured to generate and encode a first transmission terahertz wave, a center frequency of which is a first center frequency, using photomixing;
    a second terahertz wave generation unit configured to generate and encode a second transmission terahertz wave, a center frequency of which is a second center frequency different from the first center frequency;
    a first terahertz wave detection unit configured to detect and decode a first reception terahertz wave corresponding to the first transmission terahertz wave; and
    a second terahertz wave detection unit configured to detect and decode a second reception terahertz wave corresponding to the second transmission terahertz wave,
    wherein the first center frequency and the second center frequency are respectively set by changing oscillation wavelengths of exciting light sources used for the photomixing,
    wherein the first terahertz wave generation unit and the first terahertz wave detection unit are modularized in a first terahertz wave transmission/reception unit corresponding to a first channel of a frequency band including the first center frequency,
    wherein the second terahertz wave generation unit and the second terahertz wave detection unit are modularized in a second terahertz wave transmission/reception unit corresponding to a second channel of a frequency band including the second center frequency, and
    wherein the oscillation wavelengths of the exciting light sources are changed to reduce crosstalk between the first channel and the second channel,
    wherein the first terahertz wave detection unit detects the first reception terahertz wave using a Schottky diode.

2. The interconnection apparatus of claim 1, further comprising frequency blocks of terahertz wave transmission/reception units respectively corresponding to a plurality of channels including the first and second channels, wherein each of the terahertz wave transmission/reception units is configured such that terahertz wave generation unit and a corresponding terahertz wave detection unit are modularized in a corresponding terahertz wave transmission/reception unit.

3. The interconnection apparatus of claim 2, wherein the frequency blocks use a narrow-band filter and a terahertz passive filter to reduce mutual crosstalk between the frequency blocks.

4. The interconnection apparatus of claim 2, wherein two or more of the frequency blocks correspond to respective channels of an identical frequency band so as to reduce a frequency bandwidth.

5. The interconnection apparatus of claim 4, wherein the frequency blocks of the terahertz wave transmission/reception units corresponding to the respective channels of the identical frequency band are arranged such that the frequency blocks do not neighbor each other so as to reduce mutual crosstalk between the frequency blocks.

6. The interconnection apparatus of claim 2, wherein the first terahertz wave transmission/reception unit sets an upstream center frequency of the first transmission terahertz wave and a downstream center frequency of the first reception terahertz wave as different frequencies.

7. The interconnection apparatus of claim 2, wherein the frequency blocks are arranged in a form of an array for large-capacity transmission.

8. The interconnection apparatus of claim 1, wherein the second terahertz wave transmission/reception unit includes a second antenna coupled to both the second terahertz wave generation unit and the second terahertz wave detection unit.

9. An interconnection method using terahertz waves, comprising:
    generating and encoding a first transmission terahertz wave, a center frequency of which is a first center frequency, using photomixing;
    generating and encoding a second transmission terahertz wave, a center frequency of which is a second center frequency different from the first center frequency;
    detecting and decoding a first reception terahertz wave corresponding to the first transmission terahertz wave; and
    detecting and decoding a second reception terahertz wave corresponding to the second transmission terahertz wave,
    wherein the first center frequency and the second center frequency are respectively set by changing oscillation wavelengths of exciting light sources used for the photomixing,
    wherein generating the first transmission terahertz wave and detecting the first reception terahertz wave are modularized in transmitting/receiving a first terahertz wave corresponding to a first channel of a frequency band including the first center frequency,
    wherein generating the second transmission terahertz wave and detecting the second reception terahertz wave are modularized in transmitting/receiving a second terahertz wave corresponding to a second channel of a frequency band including the second center frequency, and
    wherein the oscillation wavelengths of the exciting light sources are changed to reduce crosstalk between the first channel and the second channel,
    wherein detecting the first reception terahertz wave includes using a Schottky diode to detect the first reception terahertz wave.

10. The interconnection method of claim 9, further comprising transmitting/receiving terahertz waves respectively corresponding to a plurality of channels including the first and second channels, wherein transmitting/receiving each of the terahertz waves is configured such that generating a transmission terahertz wave and detecting a corresponding reception terahertz wave are modularized in transmitting/receiving a corresponding terahertz wave.

11. The interconnection method of claim 10, wherein transmitting/receiving the terahertz waves is configured to use a narrow-band filter and a terahertz passive filter to reduce mutual crosstalk between the channels.

12. The interconnection method of claim 10, wherein two or more of the transmitting/receiving terahertz waves correspond to respective channels of an identical frequency band so as to reduce a frequency bandwidth.

13. The interconnection method of claim 12, wherein transmitting/receiving the terahertz waves corresponding to the respective channels of the identical frequency band is configured to transmit/receive the terahertz waves so that the channels do not neighbor each other so as to reduce mutual crosstalk between the channels.

14. The interconnection method of claim 10, wherein transmitting/receiving the first terahertz wave is configured to set an upstream center frequency of the first transmission terahertz wave and a downstream center frequency of the first reception terahertz wave as different frequencies.

15. The interconnection method of claim 10, wherein transmitting/receiving the terahertz waves are configured to transmit/receive the terahertz waves in a form of an array for large-capacity transmission.

16. The interconnection method of claim 9, further comprising:
   transmitting the second transmission terahertz wave using a second antenna; and
   receiving the second reception terahertz wave using the second antenna.

* * * * *